Aug. 11, 1964  F. J. LUKETA  3,143,821
LINES FOR TRAWL NETS
Filed Dec. 26, 1961  7 Sheets-Sheet 3
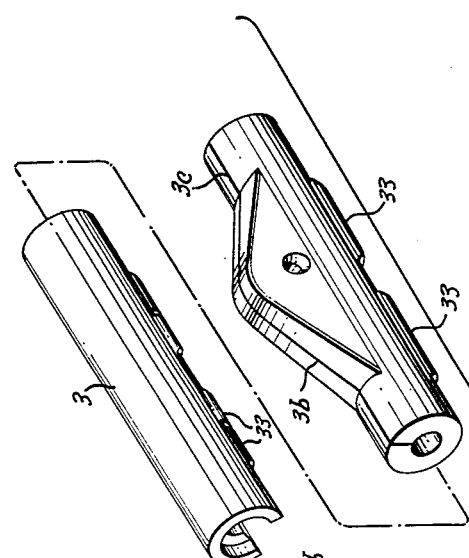
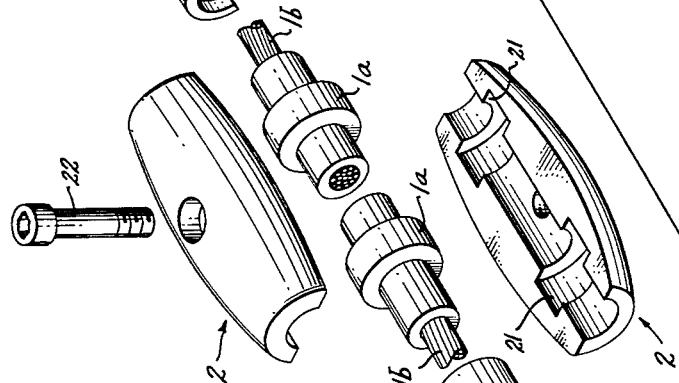
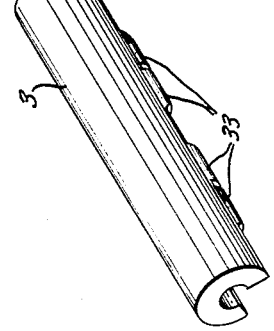
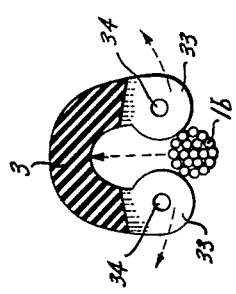
INVENTOR.
FRANK J. LUKETA
BY
Reynolds + Christensen
ATTORNEYS

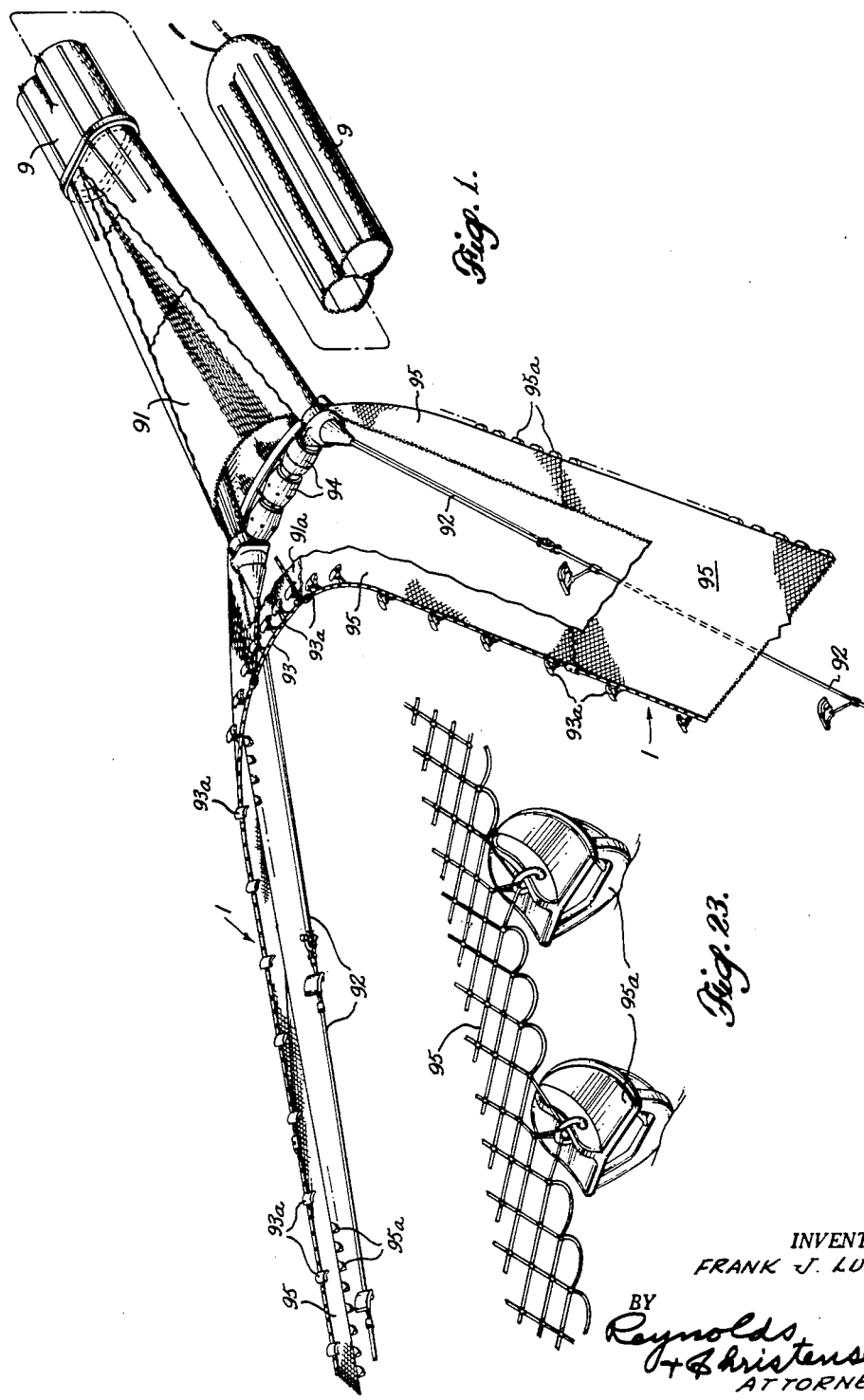

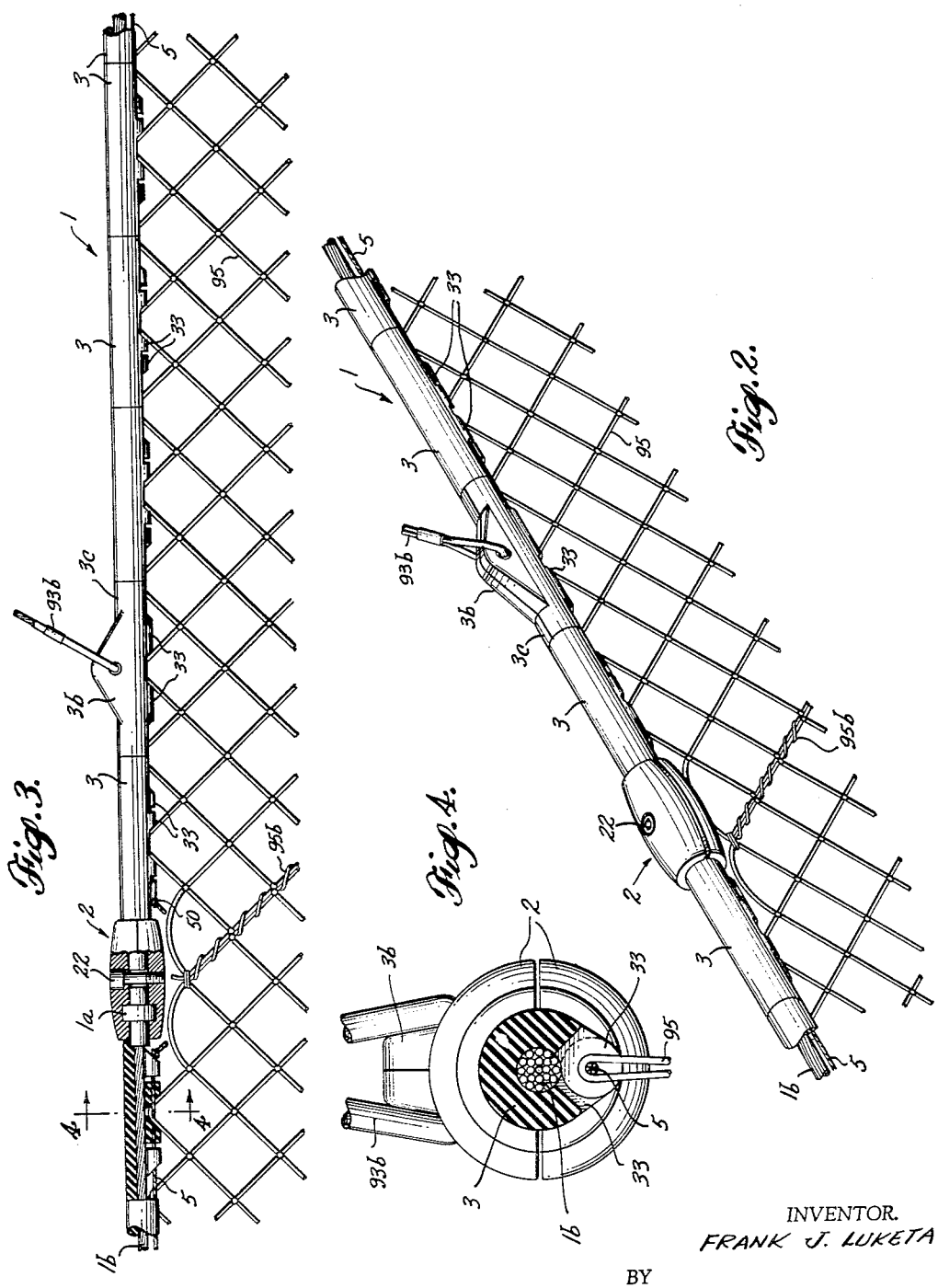

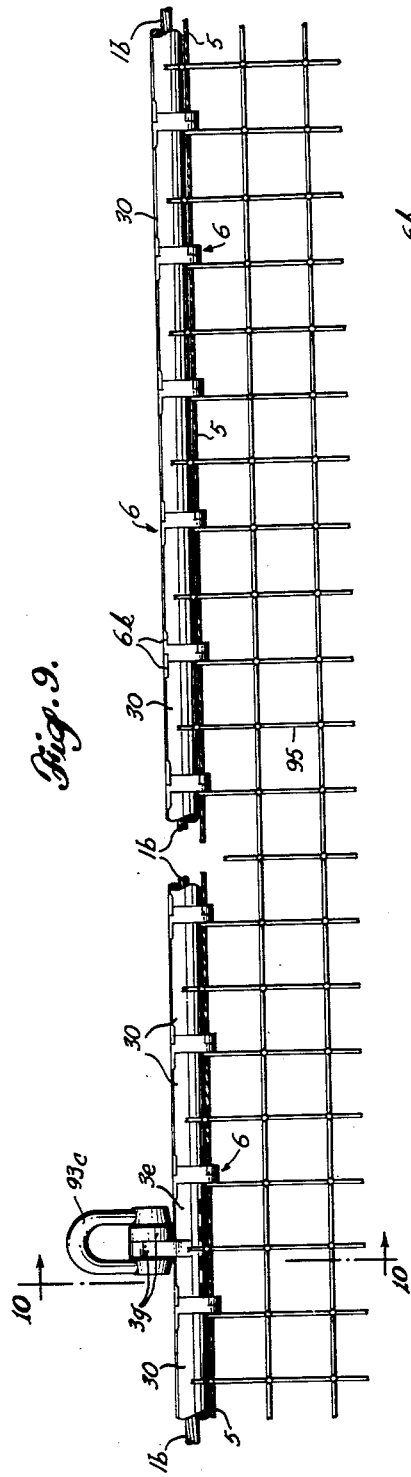
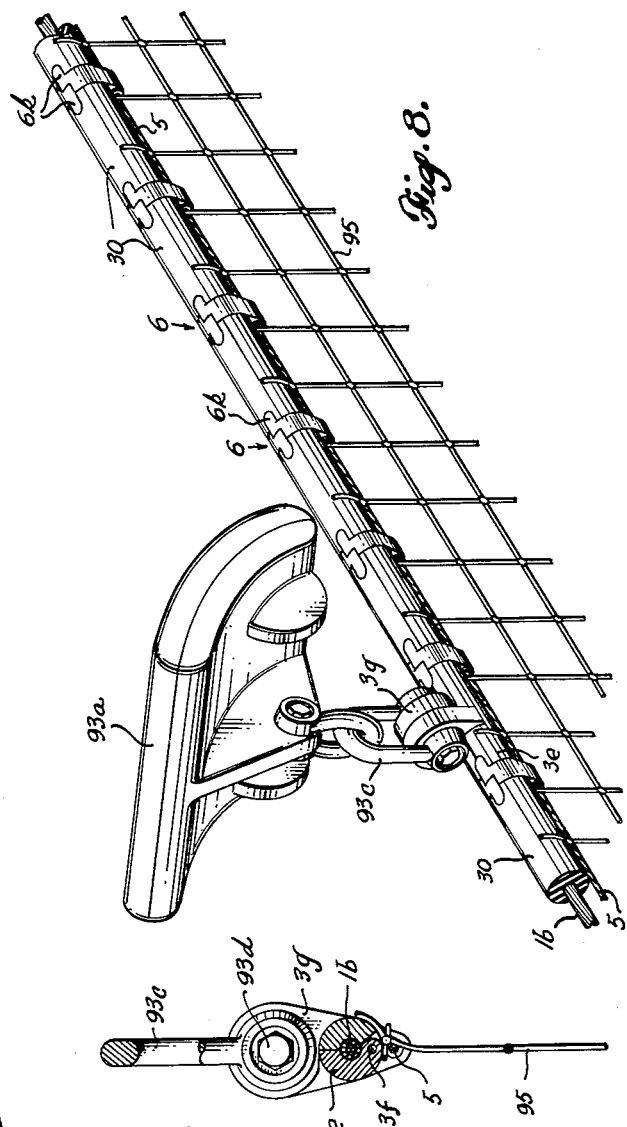

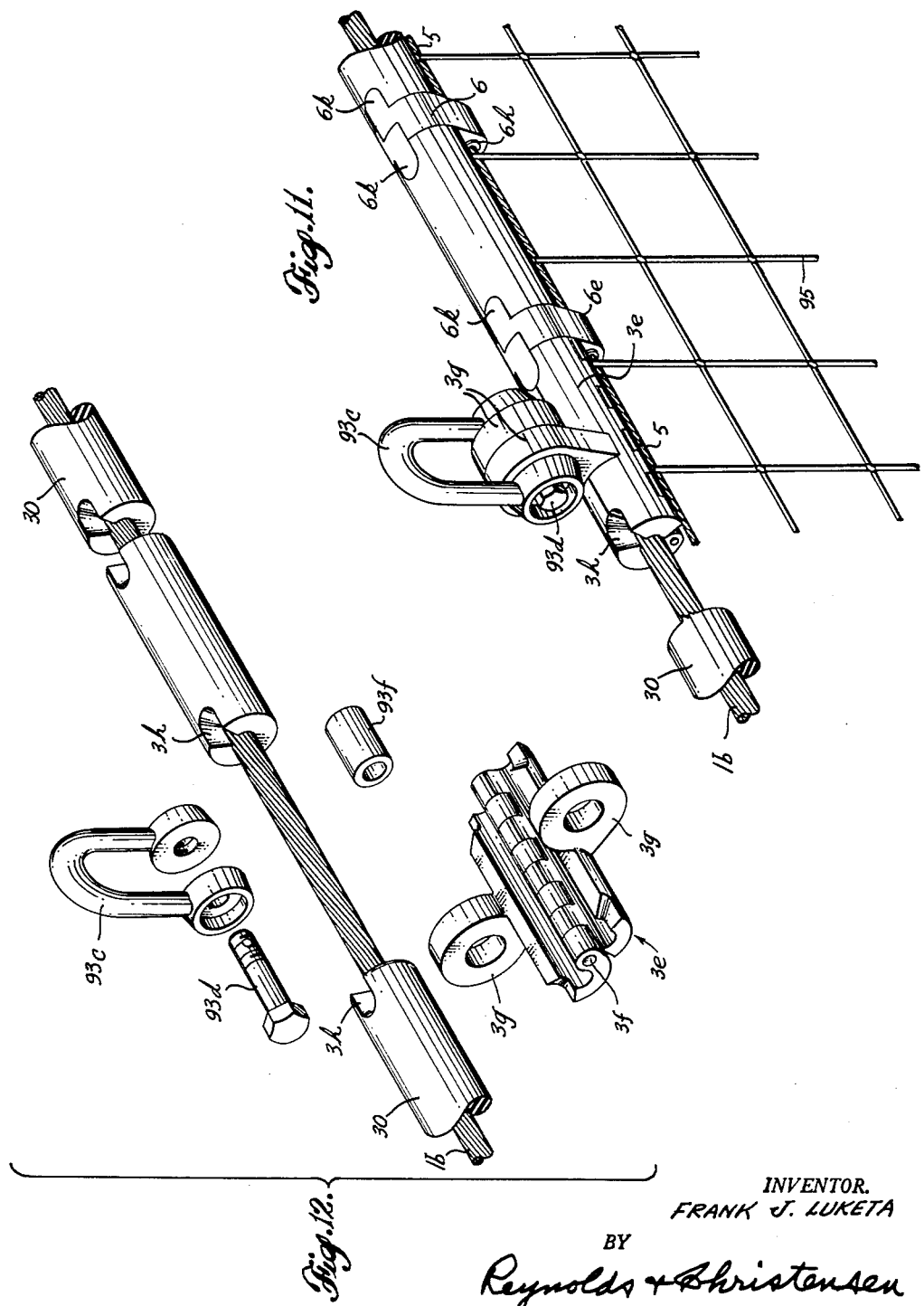

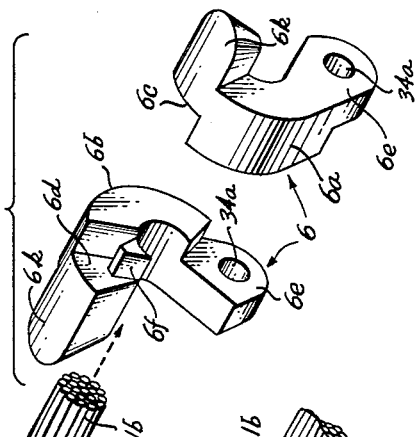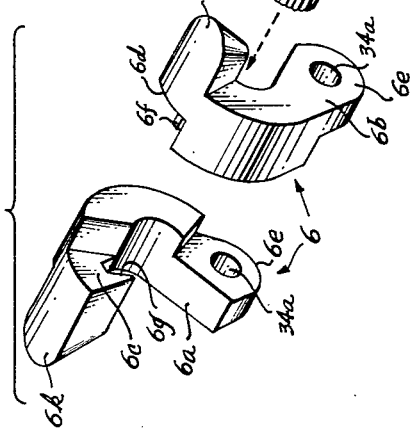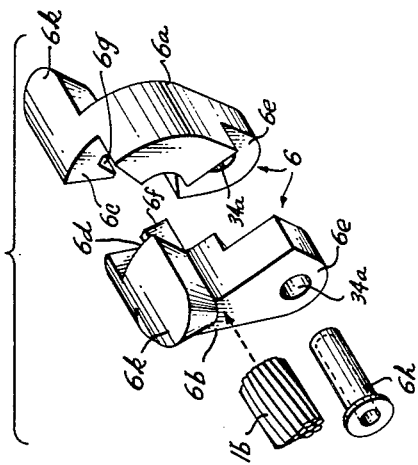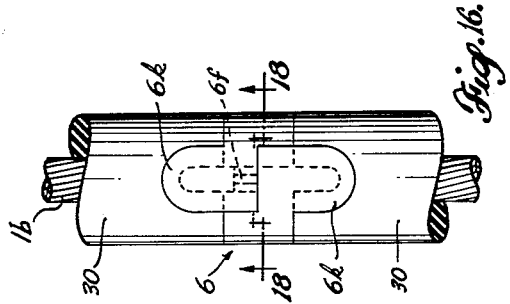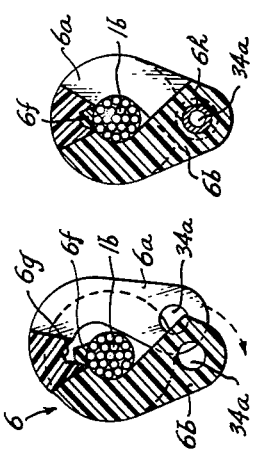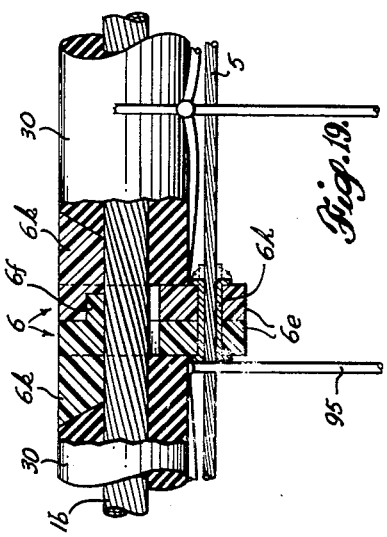

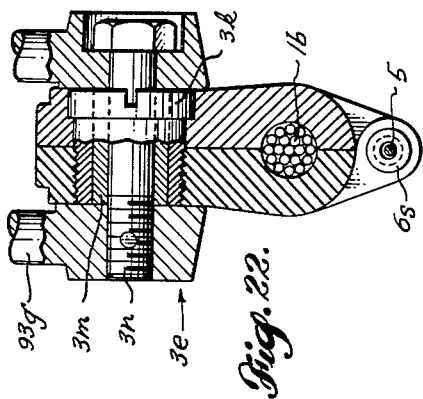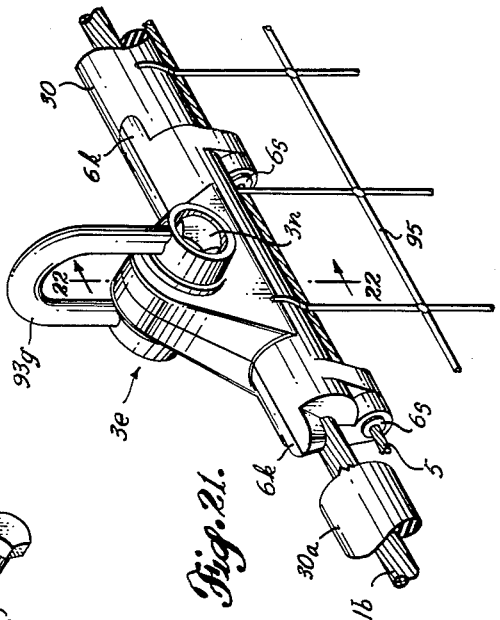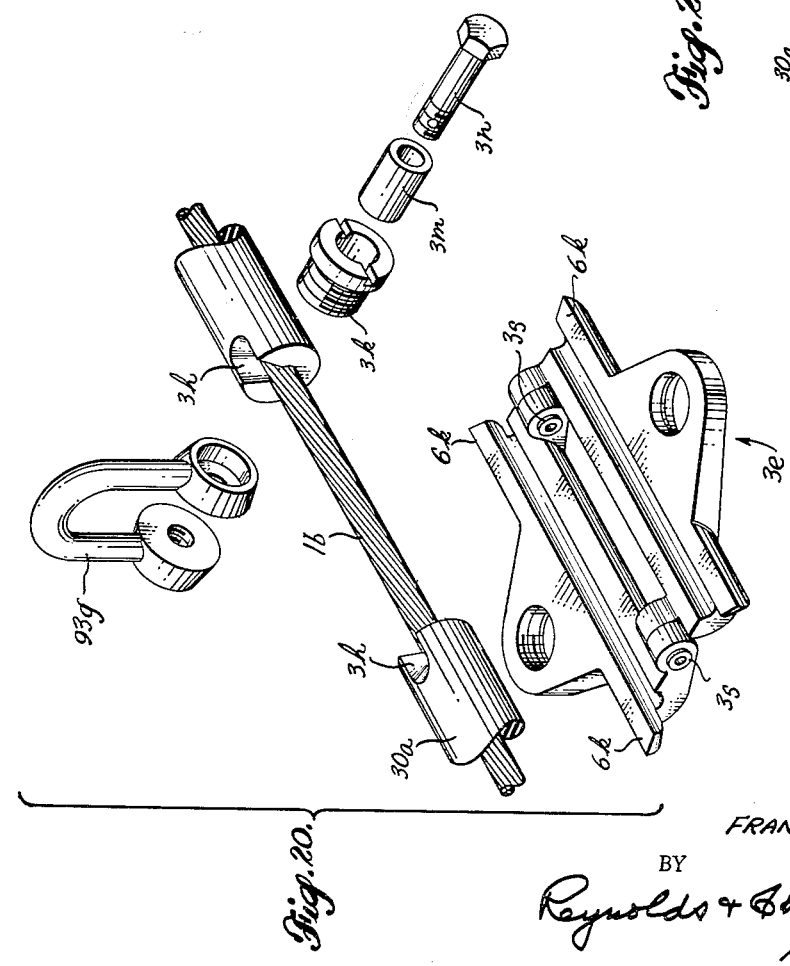

United States Patent Office 3,143,821
Patented Aug. 11, 1964

3,143,821
LINES FOR TRAWL NETS
Frank J. Luketa, 5567 Greenwood Ave.,
Seattle 3, Wash.
Filed Dec. 26, 1961, Ser. No. 162,043
11 Claims. (Cl. 43—9)

This invention, like those disclosed and claimed in patents bearing the same title (namely, Patent No. 3,102,357; Patent No. 3,102,356; Patent No. 3,076,281; and Serial No. 160,013, filed December 18, 1961) pertains to a line, such as a curtain line, for use with trawl nets. A curtain hangs from each such line, but since there is no stress except water drag on the line and on the wide open meshes, there is relatively small tension in such lines, notwithstanding their considerable length. The entire codend is dragged by sweep lines, independent of the curtain lines, and it is these sweep lines that are quite highly stressed at times. To prevent the curtain from wrapping about the curtain line from which it hangs, the upper edge of the curtain must be properly aligned throughout its rather considerable length. Various provisions to this end are disclosed in the several applications referred to above; this application concerns a preferred form of protective casing elements for the line, with provisions for hanging the curtain therefrom, and for attaching accessories such as floats to the line.

This application is related rather closely to Serial No. 160,013, but whereas that application deals primarily with the relationship of the several elements of the line and its casing when assembled, this application deals with the form of certain casing elements per se, and the relationship of the several elements produced when such certain elements are used.

The curtain line includes a flexible core and a protective casing surrounding the same, and the mesh curtain is secured removably to the curtain line by means of a hanging line, threaded through mesh squares along the upper edge of the curtain, and through apertures provided along the curtain line. It is a particular object of this invention to provide casing elements for the line, to encase and protect its core, in forms which are readily engageable with and disengageable from the core, provided the hanging line is removed, but which carry ears so arranged that when the hanging line is in place the casing ears are held in alignment by the hanging line passed through them, so that the casing elements can not be disengaged from the core. Thus the hanging line not only suspends the curtain from the curtain line, but insures retention of the casing elements (at least, those that are removable) in operative position upon the core. In a given form not all casing elements have such ears, but those which do are so interengaged with those which do not that all casing elements are held in place by the hanging line.

It is also an object to provide casing elements which are readily engageable and disengageable, and which are of various types, including one type for anchorage of accessories such as floats, all of which types engage the core in the same general manner, and the preferred form is held fast to the core solely by the hanging line when all elements are fully assembled.

It is a further object to provide casing elements which, in one form, interlock for automatic axial alignment, and so require no care to insure correct alignment.

Other objects, especially as they relate to alternative or modified forms of the several elements, will appear as this specification progresses.

The accompanying drawings show the invention in several different embodiments, and a preferred form will be designated.

FIGURE 1 is an isometric view of a net body and curtains, partly broken away, illustrating the general relationship of the parts.

FIGURE 2 is an isometric view, to a larger scale, showing the preferred form of the casing elements, all assembled in relation to the other elements of the curtain and curtain line.

FIGURE 3 is an elevational view, partly in section, of the same assembly, and FIGURE 4 is a cross-sectional view at the line 4—4 of FIGURE 3, also showing the preferred form.

FIGURE 5 is a cross-sectional view, similar to FIGURE 4, illustrating the operation of applying a casing element to the core.

FIGURE 6 is an exploded isometric view of various elements of the line, unassembled.

FIGURE 7 is an underside isometric view of most of the same elements, assembled, and shown partly in section.

FIGURE 8 is an isometric view of a modified form of the casing, assembled; FIGURE 9 is an elevational view of the same, partly broken away, and FIGURE 10 is a detail section at the line 10—10 of FIGURE 9.

FIGURE 11 is a view of the same construction to a larger scale, similar to FIGURE 8, but partly broken away, and FIGURE 12 is an exploded isometric view of the same, omitting certain collar elements employed at spaced intervals.

FIGURE 13 is an exploded isometric view of a collar element omitted from FIGURE 12, and FIGURES 14 and 15 are similar views of the same from different viewpoints.

FIGURE 16 is a plan view of the line, illustrating particularly the collar element, and FIGURES 17 and 18 are cross sections at the line 18—18 of FIGURE 16, illustrating the collar element in process of application to the core, and fully assembled thereon, respectively.

FIGURE 19 is a sectional view axially of the line, with the casing elements assembled and the curtain hung from the line.

FIGURE 20 is an exploded isometric view similar to FIGURE 12, but illustrating a modified form of the float securing casing elements; FIGURE 21 is an assembled isometric view of the same, similar to FIGURE 11, and FIGURE 22 is a cross-sectional view of the same, at the line 22—22 of FIGURE 21.

FIGURE 23 illustrates, in an isometric view, the weights along the lower edge of a curtain panel.

In general, the net to which the present invention is applied is shown as a bottom trawl net, although it could also be applied to a midwater trawl net. It comprises a net proper, including a codend 9 closed at its after end during use, and open at its forward end and there merging into a forwardly divergent funnel 91 of mesh. Sweep lines 92 diverging from the net proper to doors not shown, assume the drag of the body of net and its load of fish. Curtains of light mesh at 95 are secured to the opposite sides of the forward edge or bosom of the funnel, and diverge forwardly. They are suspended at their upper edge from a curtain line 1, and hang free at their lower edge, where weights 95a distributed along such lower edge distend them downwardly and rearwardly. The curtain lines 1 also connect to the doors, but are not heavily stressed. At their after ends the curtains are laced or otherwise removably joined to the side edges of the overhang of the funnel 91a, just as successive curtain panels are similarly joined to one another. The curtain lines 1 in effect extend continuously across the upper bosom 93 of the net, and such lines are buoyed up by floats 93a distributed along them. Bobbins 94 which roll along the bottom may support the lower bosom somewhat above the bottom, to avoid snagging.

This invention concerns the lines, and especially the curtain lines 1, the protective casing which forms a part thereof, and the construction of casing elements whereby they are applied to and retained upon the core of the line, and are retained in operative position by a hanging line by which the curtain's upper edge is supported.

Referring now to FIGURES 2 to 7, wherein the preferred form of casing elements is shown, these comprise a plurality of sleeve elements 3 which in their operative position surround the core 1b and end-abut one another. If the core is of the full length of the several lines the sleeve elements may be of a corresponding length in the aggregate, but it is convenient to make the curtain panels of relatively short lengths, laced together at 95b, and to make the line of like lengths, coupled together at 2 for quick separation and reconnection. Since the core 1b is normally of stranded steel cable, a metal head 1a may be swaged on each end of a core section (see FIGURES 3 and 6), and the adjoining heads may be received in the shouldered recesses 21 of a longitudinally divided two-part coupler 2, the parts of which can be clamped about the heads 1a by the clamp screw 22.

The space along the core 1b between couplers 2 is completely filled by casing elements in the form of longitudinally split sleeves 3. Preferably these sleeves are of a wear-resistant rubber-like material, or perhaps molded nylon, and hence are to some degree flexible, sufficiently so that they can be separated along their longitudinal split to straddle the core 1b, as is shown in FIGURE 5. Ears 33 are formed at intervals along the split, on each side thereof, and when fully assembled on the core these ears 33 lie in alignment. Each has a longitudinally directed hole 34, all of which holes come into alignment when the individual sleeves and the casing as a whole are assembled on the core, and a hanging line 5 is threaded through these holes 34 and through the mesh squares along the upper edge of the net panel (see FIGURE 7), and thereby the curtain 95 is held to and hung from the line 1. At the same time the casing elements are locked in place upon the core. The ends of the hanging line 5 are secured in any suitable manner, as by tying or knotting at 50.

Wherever in the length of the line it is necessary to provide an anchorage for a float 93a, a casing element 3c of construction similar to that of the elements 3 may be used, differing in that its split is along its upper instead of its lower edge, and it is formed with an ear 3b upstanding at each side of its split, for engagement by a strap 93b to which the float is secured.

Except as the core-receiving hole lengthwise of the casing elements 3 or 3c may be molded to fit the cable strands there is little to insure that individual casing elements will not rotate slightly about the core, one relative to another. The form of casing shown in FIGURES 8 to 19 has means interlocking its several elements, to insure that all are accurately aligned, and that relative rotation is impossible. In this form the sleeve elements 30 are either molded in place upon the core 1b, or are threaded thereon; they need not be split lengthwise. Only the anchorage elements 3e are shown as split, and are made of two parts, hingedly joined at 3f (FIGURE 12) and formed with ears 3g which when the elements 3e are closed about the core 1b are in alignment, and receive the hinge pin 93d of an anchorage clevis 93c for a float or the like. This holds the anchorage element 3e closed about the cable core.

In this form of casing the elements 30 and 3e are not continuous along the core, but two-part collars 6 are interspersed between them. These collars 6 are shown in some detail in FIGURES 13 to 19. They are desirably of molded rubber composition, or nylon, with the two parts 6a and 6b complementally shouldered or recessed at 6c and 6d, and formed with the apertures 34a in the ears 6e which, when the shoulder 6c and 6d interfit, are in alignment. The hanging line is threaded through the apertures in the ears 6e, or through a thimble 6h received therein. This holds the two-part collar 6 closed about the core 1b. The two parts 6a and 6b are interfitted opposite to the ears 63, as by the rib 6f on one and the complemental notch 6g in the other; compare FIGURES 17 and 18. The thimble 6h passed through the aligned apertures in the two ears 6e is upset at one end to retain it in place, and holds the collar upon the core, but it can be removed to permit removal of the collar. Finally, each collar half has an axially directed nose 6k, and each sleeve or casing element 30 or 3e is formed at its ends with complemental notches 3h into which the aligned noses 6k fit. Thus all elements 30 and 3e are accurately and automatically aligned. The casing element 30 might even be split, to straddle the core, but by the interengagement of noses 6k and notches 3h the spreading of the elements 30 can be prevented; hence, by the threading of hanging line 5 through the ears 6e of casing elements 6a, 6b, and by the interengagement of the latter casing elements with the further casing elements 30, disengagement of the casing from the core is prevented until the hanging line 5 is removed.

Where the two parts of an element 3e are hingedly interconnected, as in FIGURE 12, when the ears 3g come into alignment, the ears serve as an anchorage for a float 93a or like accessory. The clevis 93c may have its pivot axis parallel to the length of the line, and be secured by a spacer sleeve 93f through the apertures of the clevis, held by a bolt 93d, as in FIGURES 11 and 12, or a slightly modified construction as in FIGURES 20 to 22 may be employed In the latter construction the hollow pivots 3s interconnecting the halves of element 3e are at the ends only, and serve as apertures for hanging line 5 (see FIGURE 22). The two halves of element 3e in this latter construction when closed about the core 1b, are held together by a threaded and shouldered sleeve 3k, and a pivot spacer sleeve 3m and bolt 3n through the sleeve 3k and the pivot apertures of clevis 93g constitute an anchorage for a float or the like.

In all these forms there is a casing element, whether a sleeve 3, 3b, 3e or collar 6, all of which are split along one side and hingedly (or flexibly) connected along the opposite side so that it may open to straddle the core, and then close to bring ears or the like into alignment. These ears are apertured, and receive either (or both in the case of the latter version of 3e) a hanging line to support the curtain mesh or a pivot support for a clevis or similar element. In either case the completion of the assembly locks the hinged casing element in place upon the core, yet disassembly is readily accomplished, but only by the withdrawal of the hanging line or the like.

In the present invention, and differing from Serial No. 160,013, in this very important respect, it will be noted that the hanging line 5 terminates in sleeve 3 at 50 (see FIGURES 3 and 7) and not within the coupler 2. This permits the sleeves to pivot as required about the core 1b into automatic and perfect alignment with one another, induced by the water drag on the curtain panels during trawling. If the hanging lines were terminated in the couplers as in Serial No. 160,013, all the many couplers would have to be in accurate alignment and this is extremely difficult to maintain in a long line because of the varying torsional forces caused by the twisted lay construction of the cable core as it is varyingly stressed during trawling. In a short curtain line the construction of Serial No. 160,013 would be entirely suitable.

I claim as my invention:

1. A line for use in a trawl net or the like, comprising a core of inelastic material and a casing about said core, said casing including elements divided lengthwise and separable along the dividing line to straddle said core, said elements being formed at each side of the dividing line with complemental apertured ears which when the element is closed about the core have their apertures in alignment, longitudinally directed noses on the divided elements, casing elements upon the core and end-abutted by said divided elements, and having a notch located for reception of the noses of the latter, to secure all parts in alignment, and a line extending through the aligned apertures of said ears, to retain the casing elements closed about the core, and to secure other parts of the net to the line.

2. In combination with a trawl net panel of mesh, a line extending along an edge of said net panel, said line including a core of inelastic material and a protective casing about said core, said casing including a plurality of casing elements divided lengthwise and separable along their line of division to straddle the core, ears formed on opposite sides of the line of division of certain of said casing elements, and aligned longitudinally when the casing surrounds the core, and a hanging line extending through said ears, and through intervening meshes of the net panel, to interconnect the net panel and the line, and at the same time to preclude separation of the straddling casing elements and their removal from the core.

3. In combination with a trawl net panel of net mesh or the like, a line extending along an edge of said panel, said line comprising a core of inelastic material and a sectional casing of protective material about said core, said casing including a plurality of sleeve elements divided lengthwise and separable along the dividing line to straddle said core, said sleeve elements being each formed with complemental apertured ears along opposite sides of the dividing line which when the element is closed about the core have their apertures in alignment generally lengthwise of the line, and hanging line means for threading through the mesh squares of which the mesh panel is formed, and through the apertures of the ears, to retain the sleeve elements closed about the core, and the mesh panel secured to the line, until the hanging line means is removed.

4. A line as in claim 3, wherein the divided sleeve elements are of flexible material, and are divided along that side only which is adjacent the net panel in use.

5. A line for use in securing to the edge of a trawl net panel or the like, comprising a core of inelastic material and a casing about said core, said casing including sleeve elements and collars interspersed between and abutting ends of the sleeve elements, said collars being each formed of two parts, the collars and the sleeves which they abut having interfitting noses and notches directed lengthwise of the line, to maintain the several parts in alignment, a hanging line extending lengthwise along the cored line, the collar parts being apertured to receive said hanging line, and the hanging line extending through the mesh squares of a net panel intermediate the collars, to secure the edge of the net panel to said line, and to retain the collars closed about the core.

6. A line for use in securing to an edge of a trawl net panel, comprising a core of flexible but substantially inelastic material, and a casing of protective material about said core, said casing including a plurality of casing elements which are divided lengthwise and separable along the dividing line to straddle said core, hanging line means extending lengthwise of the encased line for extension at intervals through mesh squares of the net panel, the casing elements having engaging means located at intervals intermediate the so-engaged mesh squares, for receiving the hanging line, a transversely directed flexible element, and means located at opposite sides of the dividing line of the casing elements, for engagement by the transversely directed flexible element to draw together the opposite parts of the casing elements, and so to retain the latter closed about the core.

7. The combination of a line and a trawl net panel along an edge whereof said line is secured, said line comprising a core of flexible but inelastic material, and a casing of protective material about said core, said casing including elements which are divided lengthwise and separable along the dividing line to straddle said core, said elements being formed with complemental transversely apertured ears along opposite sides of the dividing line, means passed through the ears and urging them together, to retain the elements closed about the core, a hanging line extending lengthwise said cored line and at intervals through mesh squares of the net panel, the casing elements having means engageable by said hanging line, intermediate points of engagement of the latter with the mesh squares, to secure the net panels to the cored line so long as the hanging line remains so engaged.

8. In combination with a net panel of mesh, a line extending along an edge of said net panel, said line comprising a core of inelastic material and a flexible, sectional casing about said core, said casing comprising a plurality of casing elements, each of said casing elements being divided lengthwise and being separable along the dividing line to straddle said core, said casing elements being each formed with complemental ears having openings therein which when the said element is closed about the core are substantially in alignment with each other, and hanging line means insertable through said aligned openings and in between the ears through the mesh squares of the net panel, to suspend the panel from said line.

9. In combination with a trawl net panel of mesh, a line extending along an edge of said panel and comprising a core and a flexible, sectional casing surrounding said core, a collar disposed between two adjacent sections of said casing and comprising two substantially complemental halves each having shoulder means at one side to interfit with the shoulder means of the other half, and formed at its opposite side with apertured ears which when the collar embraces the core and the shoulders interengage have their apertures in alignment, and means engaging portions of said net panel and insertable through said aligned apertures in said ears, to suspend the panel from said line.

10. A collar for use in encasing a core of a line for use in trawl nets or the like, said collar comprising two substantially complemental halves each having shoulder means at one side to interfit with the shoulder means of the other half, and formed at its opposite side with apertured ears which when the collar embraces a core and the shoulders interengage have their apertures in alignment for reception of a hanging line, and wherein one collar half is formed at its side opposite the ear with a longitudinally directed inwardly facing notch and a rib is formed on the other half, said rib being complementally received in said notch.

11. In combination with a trawl net panel of mesh, a line extending along an edge of said net panel and including an inelastic core and a protective casing, said core being formed of separable lengths, coupler means interconnecting the individual lengths for separation and reassembly, said casing comprising a plurality of individual casing elements each including hinge means along one edge for separation at its opposite edge to straddle the core, and also including apertured ears which, when the casing elements are in position of use are in lengthwise alignment, and a hanging line for each length of said core, each hanging line being of a length corresponding to that of its associated length of the core, each of said hanging lines being received in the apertures of the casing elements that surround its associated length of the core, and each such hanging line engaging with meshes of the net panel and being secured at its respective ends to the terminal pair of said casing elements that surround the associated length of the core.

References Cited in the file of this patent
UNITED STATES PATENTS

| | | |
|---|---|---|
| 1,282,036 | Bowditch | Oct. 22, 1918 |
| 1,564,382 | Treiman | Dec. 8, 1925 |
| 2,894,366 | Leckie | July 14, 1959 |